(12) United States Patent
Lee

(10) Patent No.: US 11,983,130 B2
(45) Date of Patent: May 14, 2024

(54) MULTI-IMAGE OUTPUT SYSTEM AND USB HUB THEREOF

(71) Applicant: GENESYS LOGIC, INC., New Taipei (TW)

(72) Inventor: Wei-Te Lee, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 74 days.

(21) Appl. No.: 17/570,339

(22) Filed: Jan. 6, 2022

(65) Prior Publication Data

US 2022/0269630 A1 Aug. 25, 2022

(30) Foreign Application Priority Data

Feb. 22, 2021 (TW) ................................. 110106102

(51) Int. Cl.
*G06F 13/38* (2006.01)
*G06F 3/14* (2006.01)

(52) U.S. Cl.
CPC .......... *G06F 13/385* (2013.01); *G06F 3/1423* (2013.01); *G06F 2213/0042* (2013.01)

(58) Field of Classification Search
CPC ................. G06F 13/385; G06F 3/1423; G06F 2213/0042; G06F 3/023; G06F 3/14; G09G 2370/24
See application file for complete search history.

(56) References Cited

U.S. PATENT DOCUMENTS

2005/0102462 A1 5/2005 Choi
2005/0235091 A1* 10/2005 Chen ................... G06F 13/4022
710/313

(Continued)

FOREIGN PATENT DOCUMENTS

CN 101206628 6/2008
CN 201222250 4/2009
(Continued)

OTHER PUBLICATIONS

"Office Action of Taiwan Counterpart Application", issued on May 27, 2022, p. 1-p. 8.
"Office Action of China Counterpart Application", issued on Aug. 21, 2023, p. 1-p. 11.
"Notice of allowance of China Counterpart Application", issued on Feb. 22, 2024, p. 1-p. 5.

*Primary Examiner* — Benjamin C Lee
*Assistant Examiner* — Nathan P Brittingham
(74) *Attorney, Agent, or Firm* — JCIPRNET

(57) ABSTRACT

A USB hub, including multiple USB upstream ports, multiple downstream ports, multiple image processing units, a USB hub unit, a first multiplexer, and a second multiplexer, is provided. The USB upstream ports include a first USB upstream port and a second USB upstream port. The downstream ports include a first downstream port and a second downstream port. The image processing units include a first image processing unit and a second image processing unit. The first multiplexer is coupled to the first USB upstream port, the second USB upstream port, the first image processing unit, the second image processing unit, and the USB hub unit. The second multiplexer is coupled to the first image processing unit, the second image processing unit, the USB hub unit, the first downstream port, and the second downstream port.

15 Claims, 14 Drawing Sheets

(56) References Cited

U.S. PATENT DOCUMENTS

| | | | |
|---|---|---|---|
| 2006/0123182 A1* | 6/2006 | Sandulescu | G06F 3/023 |
| | | | 710/316 |
| 2008/0005262 A1 | 1/2008 | Wurzburg et al. | |
| 2009/0279473 A1* | 11/2009 | Lu | G09G 5/12 |
| | | | 370/329 |
| 2011/0022769 A1 | 1/2011 | Hung et al. | |
| 2011/0060849 A1* | 3/2011 | Lin | G06F 3/14 |
| | | | 710/15 |
| 2011/0093623 A1 | 4/2011 | Chen | |
| 2015/0277527 A1 | 10/2015 | Liu | |
| 2017/0308498 A1 | 10/2017 | Chen | |
| 2018/0143934 A1* | 5/2018 | Li | G06F 13/385 |
| 2018/0336154 A1* | 11/2018 | Ghosh | G06F 13/4068 |
| 2020/0312271 A1* | 10/2020 | Derr | G06F 3/1431 |
| 2021/0141753 A1* | 5/2021 | Yin | G06F 13/4022 |

FOREIGN PATENT DOCUMENTS

| | | |
|---|---|---|
| CN | 108763130 | 11/2018 |
| CN | 109522257 | 3/2019 |
| CN | 110098541 | 8/2019 |
| CN | 212012770 | 11/2020 |
| JP | 2002290424 | 10/2002 |
| JP | 2004328262 | 11/2004 |
| TW | I557569 | 11/2016 |
| TW | 201901455 | 1/2019 |
| TW | 684869 | 2/2020 |

* cited by examiner

MULTI-IMAGE OUTPUT SYSTEM AND USB HUB THEREOF

CROSS-REFERENCE TO RELEVANT APPLICATION

This application claims the priority benefit of Taiwan application serial no. 110106102, filed on Feb. 22, 2021. The entirety of the above-mentioned patent application is hereby incorporated by reference herein and made a part of this specification.

BACKGROUND

Technical Field

This disclosure relates to an electronic device, and in particular to a multi-image output system and a Universal Serial Bus (USB) hub thereof.

Description of Related Art

Universal Serial Bus (USB) is a serial port bus standard for connecting a host and am external device, and it is also a technical specification for input and output interfaces. USB is widely used in personal computers, mobile devices, photographic equipment, digital TVs (set-top boxes), game consoles and other products. A USB hub allows a host system to connect to more external devices. The USB hub may also serve as a repeater, so as to broadcast data downloaded from a host to a USB device (external device), and transmit data uploaded by the USB device to the host. The USB device may include a keyboard, a mouse, a printer or other peripheral devices. In general, a USB system may only have one USB host, and other electronic devices in this USB system are all USB devices. Usually, the USB hub has only one upstream port (USB connector) to connect to the USB host. In general, the USB hub cannot be connected to multiple USB hosts concurrently.

SUMMARY

This disclosure provides a multi-image output system and a universal serial bus (USB) hub thereof, so as to provide multiple USB upstream ports and enable transmission of image data of the USB upstream ports to be independent of each other.

In an embodiment of the disclosure, the USB hub includes multiple USB upstream ports, multiple downstream ports, multiple image processing units, a USB hub unit, a first multiplexer, and a second multiplexer. The USB upstream ports include a first USB upstream port and a second USB upstream port. The downstream ports include a first downstream port and a second downstream port. The image processing units include a first image processing unit and a second image processing unit. The first multiplexer is coupled to the first USB upstream port, the second USB upstream port, the first image processing unit, the second image processing unit, and the USB hub unit. The second multiplexer is coupled to the first image processing unit, the second image processing unit, the USB hub unit, the first downstream port, and the second downstream port.

In an embodiment of the disclosure, the multi-image output system includes a first USB host, a second USB host, a USB hub, a first image display device, and a second image display device. The USB hub includes a first USB upstream port, a second USB upstream port, and multiple downstream ports. The first image display device and the second image display device are coupled to two of the downstream ports.

Based on the above, the USB hub according to the embodiment of the disclosure provides the multiple USB upstream ports to facilitate coupling to the multiple USB hosts. The USB hub also provides the multiple image processing units to enable the transmission of the image data of the USB upstream ports to be independent of each other.

To make the abovementioned more comprehensible, several embodiments accompanied by drawings are described in detail as follows.

DESCRIPTION OF THE EMBODIMENTS

Figure 1:
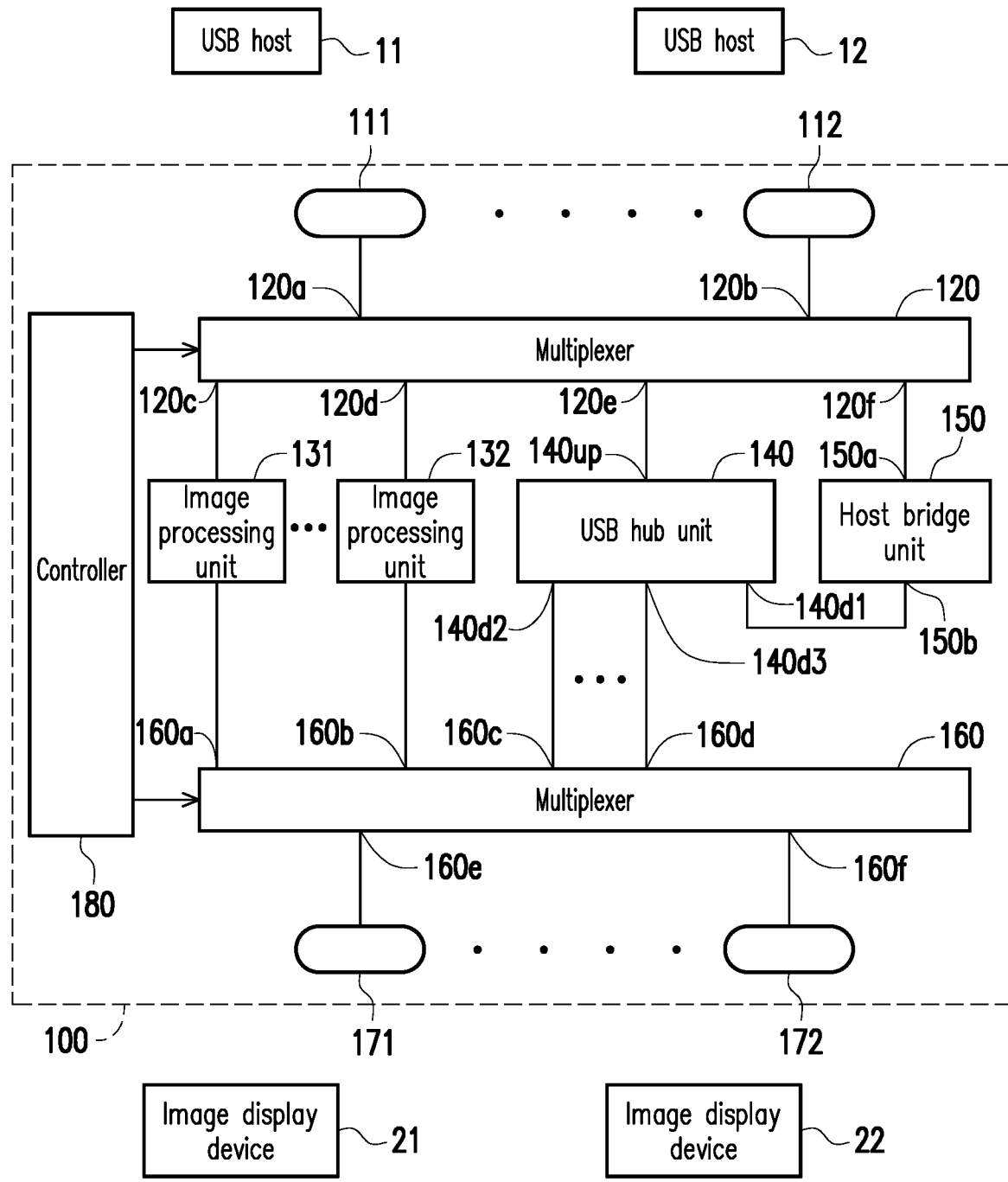
FIG. 1 is a schematic diagram of a circuit block of a multi-video output system and a Universal Serial Bus (USB) hub thereof according to an embodiment of the disclosure.

The term "coupled to (or connected to)" used in the full text of the specification of this disclosure (including the scope of the patent application) may refer to any direct or indirect connection means. For example, if the text describes that the first device is coupled (or connected) to the second device, it should be interpreted as that the first device may be directly connected to the second device, or the first device may be indirectly connected to the second device through other devices or some forms of connection means. Terms such as "first" and "second" mentioned in the full text of the specification of this disclosure (including the scope of the patent application) are used for naming an element, or to distinguish between the different embodiments or ranges, and are not used to limit an upper limit or an lower limit of the number of the element, and are not used to limit a sequence of the element. In addition, wherever possible, elements/components/steps with the same reference numerals in the drawings and the embodiments represent the same or similar parts. Reference may be made to the relevant descriptions of the elements/components/steps using the same reference numerals or using the same terminology in the different embodiments.

Universal Serial Bus (USB) is widely used as a data transmission interface between a host and a device. In addition to USB protocol, a USB data transmission path may be applied to other communication protocols, such as DisplayPort (*DP*) protocol, Thunderbolt protocol, High Definition Multimedia Interface (HDMI) protocol or other communication protocols, based on application requirements. A Power Delivery (hereinafter referred to as PD) controller of the host may negotiate a USB configuration (which a communication protocol is running on) with a PD controller of the device via a configuration channel (CC) pin of a USB connector.

FIG. 1 is a schematic diagram of a circuit block of a multi-image output system and a USB hub 100 thereof according to an embodiment of the disclosure. The multi-image output system shown in FIG. 1 includes a USB host 11, a USB host 12, a USB hub 100, an image display device 21, and an image display device 22. The USB hub 100 shown in FIG. 1 includes a controller 180, a multiplexer 120, a multiplexer (path switching circuit) 160, a USB hub unit 140, a host bridge unit 150, multiple USB upstream ports (such as 111 and 112), multiple downstream ports (such as 171 and 172) and multiple image processing units (such as 131 and 132). The multiplexer 120 may be a path switching circuit. In addition, the USB hub 100 provides the multiple image processing units 131 and 132, to enable the USB upstream ports 111 and 112 to be independent of each other during transmission of image data. In some embodiments, the image processing unit 131 and/or 132 may include a DP circuit that conforms to the DP protocol.

The USB upstream port 111 and/or the USB upstream port 112 may be a USB type-C connector or other USB connectors. The USB upstream port 111 and the USB upstream port 112 may be electrically connected to USB downstream ports of the different USB hosts 11 and 12 (such as a computer, or other electronic devices). The downstream port 171 and/or the downstream port 172 may include a USB downstream port, such as a USB type-C connector, or other USB connectors. The downstream port 171 and the downstream port 172 may be connected to different USB devices (such as a monitor, a keyboard or other peripheral devices, which are not shown) or other types of imaging devices (such as the image display devices 21 and 22). In some embodiments, at least one of the downstream port 171 to the downstream port 172 may be an image output port (such as a DP connector), and other connector of the downstream port 171 to the downstream port 172 may be a USB connector, according to actual design. The DP connector may be connected to a DP device (such as a display or other DP devices, which is not shown). That is, the image display device 21 and the image display device 22 may be coupled to the image output port and two of the downstream ports.

The multiplexer 120 shown in FIG. 1 has multiple connection terminals, such as a connection terminal 120a, a connection terminal 120b, a connection terminal 120c, a connection terminal 120d, a connection terminal 120e, and a connection terminal 120f. The connection terminal 120a is coupled to the USB upstream port 111. The connection terminal 120b is coupled to the USB upstream port 112. The connection terminal 120c is coupled to a first terminal of the image processing unit 131. The connection terminal 120d is coupled to a first terminal of the image processing unit 132. The connection terminal 120e is coupled to an upstream terminal 140up of the USB hub unit 140. The USB hub unit 140 is, for example, a hub unit conforming to a USB3 specification, therefore implementation details of the USB hub unit 140 are not repeated here. A downstream terminal 140d1 of the USB hub unit 140 is coupled to a connection terminal 150b of the host bridge unit 150. The connection terminal 120f is coupled to a connection terminal 150a of the host bridge unit 150.

The host bridge unit 150 may provide a bridging interface to enable the different USB hosts to exchange data with each other. For example, the USB host 11 (first electronic device) may provide data to the another USB host 12 (second electronic device) through the USB upstream port 111, the multiplexer 120, the USB hub unit 140, the host bridge unit 150, the multiplexer 120, and the USB upstream port 112, and the second electronic device may also provide data to the first electronic device through the USB upstream port 112, the multiplexer 120, the host bridge unit 150, the USB hub unit 140, the multiplexer 120, and the USB upstream port 111, when the first electronic device is connected to the USB upstream port 111 and the second electronic device is connected to the USB upstream port 112, based on the control of the multiplexer 120 by the controller 180.

The multiplexer 160 shown in FIG. 1 has multiple connection terminals, such as a connection terminal 160a, a connection terminal 160b, a connection terminal 160c, a connection terminal 160d, a connection terminal 160e, and a connection terminal 160f. The connection terminal 160c is coupled to a downstream terminal 140d2 of the USB hub unit 140. The connection terminal 160d is coupled to a downstream terminal 140d3 of the USB hub unit 140. The connection terminal 160e is coupled to the downstream port 171. The connection terminal 160f is coupled to the downstream port 172. The connection terminal 160a is coupled to a second terminal of the image processing unit 131. The connection terminal 160b is coupled to a second terminal of the image processing unit 132.

In some embodiments, the image processing unit 131 and the image processing unit 132 are two circuits that conform to a DP specification and operate independently. For example, the image processing unit 131 includes a DP engine, and the image processing unit 132 includes another DP engine. The embodiment does not limit implementation details of the image processing unit 131 and the image processing unit 132. In some embodiments, the image processing unit 131 and/or the image processing unit 132 may include a DP Multi-Stream Transport (MST) function that conforms to the DP specification, according to design requirements. In some embodiments, the image processing unit 131 and/or the image processing unit 132 may include a Link-Training Tunable PHY Repeater (LTTPR) circuit with a signal equalizer and a retimer. For example, the image processing unit 131 may be a repeater unit (such as an LTTPR circuit) that conforms to the DP specification, and the image processing unit 132 may include a DP MST image processing unit that conforms to the DP specification.

The controller 180 may include a Power Delivery (hereinafter referred to as PD) controller that conforms to a USB specification according to the actual design. The controller 180 may be coupled to and control connection routes of the multiplexer 120 and the multiplexer 160. For example, the controller 180 may negotiate a communication protocol (USB configuration) with an electronic device (such as the USB hosts 11 and 12) via configuration channel (CC) pins of the USB upstream port 111 and/or the USB upstream port 112. The controller 180 may control the connection route of the multiplexer 120 according to communication protocols transmitted on the USB upstream port 111 and/or the USB upstream port 112. The controller 180 may also negotiate a communication protocol (USB configuration) with an electronic device (a USB device and/or an image display device, such as the image display devices 21 and 22) via CC pins of the downstream port 111 and/or the downstream port 112. The controller 180 may control the connection route of the multiplexer 160 according to the communication protocols transmitted on the downstream port 111 and/or the downstream port 112.

Some or all of multiple data channels of the USB upstream port (111 or 112) may be used in transmission of DP data that conform to the DP specification when the USB host (11 or 12) is operated in DP alternate mode (DP ALT mode). The data channel is a differential pin pair (high-speed data transmission channel) of the USB upstream port, such as a D+ and D− pin pair, a TX1+ and TX1− pin pair, a RX1+ and RX1− pin pair, a TX2+ and TX2− pin pair, and/or a RX2+ and RX2− pin pair specified by the USB specification. Therefore, the multiplexer 120 may couple the USB upstream port 111 to one of the image processing unit 131 and the image processing unit 132, and couple the USB upstream port 112 to the other of the image processing unit 131 and the image processing unit 132 when a communication protocol transmitted on the USB upstream port 111 and a communication protocol transmitted on the USB upstream port 112 are both in the DP ALT mode.

For example, the multiplexer 120 may couple at least one of the data channels of the USB upstream port 111 to the first terminal of the image processing unit 131, and couple the remaining data channels of the USB upstream port 111 to the upstream terminal 140up of the USB hub unit 140 when the communication protocol transmitted on the USB upstream port 111 and the communication protocol transmitted on the USB upstream port 112 are both in the DP ALT mode. The multiplexer 120 may also couple at least one of the data channels of the USB upstream port 112 to the first terminal of the image processing unit 132, and couple the remaining data channels of the USB upstream port 112 to the connection terminal 150a of the host bridge unit 150.

In another example, the multiplexer 120 may couple at least one of the data channels of the USB upstream port 111 to the first terminal of the image processing unit 131, and couple the remaining data channels of the USB upstream port 111 to the upstream terminal 140up of the USB hub unit 140 when the communication protocol transmitted on the USB upstream port 111 is in the DP ALT mode and the communication protocol transmitted on the USB upstream port 112 is not in the DP ALT mode. Because the communication protocol transmitted on the USB upstream port 112 is not in the DP ALT mode, the multiplexer 120 may couple the data channels of the USB upstream port 112 to the connection terminal 150a of the host bridge unit 150.

The multiplexer 160 may couple at least one of data channels of the downstream port 171 to the second terminal of one of the image processing unit 131 and the image processing unit 132, and couple at least one of data channels of the downstream port 172 to the second terminal of the other of the image processing unit 131 and the image processing unit 132 when a communication protocol transmitted on the downstream port 171 and a communication protocol transmitted on the downstream port 172 are both in the DP ALT mode.

For example, the multiplexer 160 may couple at least one of the data channels of the downstream port 171 to the second terminal of the image processing unit 131, and couple the remaining data channels of the downstream port 171 to the downstream terminal 140d2 of the USB hub unit 140 when the communication protocol transmitted on the downstream port 171 and the communication protocol transmitted on the downstream port 172 are both in the DP ALT mode. The multiplexer 160 may also couple at least one of the data channels of the downstream port 172 to the second terminal of the image processing unit 132, and couple the remaining data channels of the downstream port 172 to the downstream terminal 140d3 of the USB hub unit 140.

In another example, the multiplexer 160 may couple at least one of the data channels of the downstream port 171 to the second terminal of the image processing unit 131, and couple the remaining data channels of the downstream port 171 to the downstream terminal 140d2 of the USB hub unit 140 when the communication protocol transmitted on the downstream port 171 is in the DP ALT mode and the communication protocol transmitted on the downstream port 172 is not in the DP ALT mode. Because the communication protocol transmitted on the downstream port 172 is not in the DP ALT mode, the multiplexer 160 may couple the data channels of the downstream port 172 to the downstream terminal 140d3 of the USB hub unit 140.

FIGS. 2 to 5 are schematic diagrams showing different operation scenarios of the multiplexers 120 and 160 shown in FIG. 1 according to an embodiment of the disclosure. In the embodiment shown in FIGS. 2 to 5, the number of the USB upstream ports is assumed to be two (that is, the USB upstream port 111 and the USB upstream port 112 shown in FIGS. 2 to 5), and the number of the downstream ports is assumed to be four (that is, the downstream port 171, the downstream port 172, a downstream port 173, and a downstream port 174 shown in FIGS. 2 to 5). In the embodiment shown in FIGS. 2 to 5, the downstream port 171 is, for example, a video output port (such as a DP connector), while the downstream port 172, the downstream port 173, and the downstream port 174 are, for example, a USB connector (such as a USB type-C connector).

In the embodiment shown in FIGS. 2 to 5, the image processing unit 132 may include a DP MST function that conforms to the DP specification. Therefore, the image processing unit 132 has, for example, a second terminal 132a and a third terminal 132b. The connection terminal 160b of the multiplexer 160 is coupled to the second terminal 132a of the image processing unit 132. A connection terminal 160g of the multiplexer 160 is coupled to the third terminal 132b of the image processing unit 132.

Figure 2:
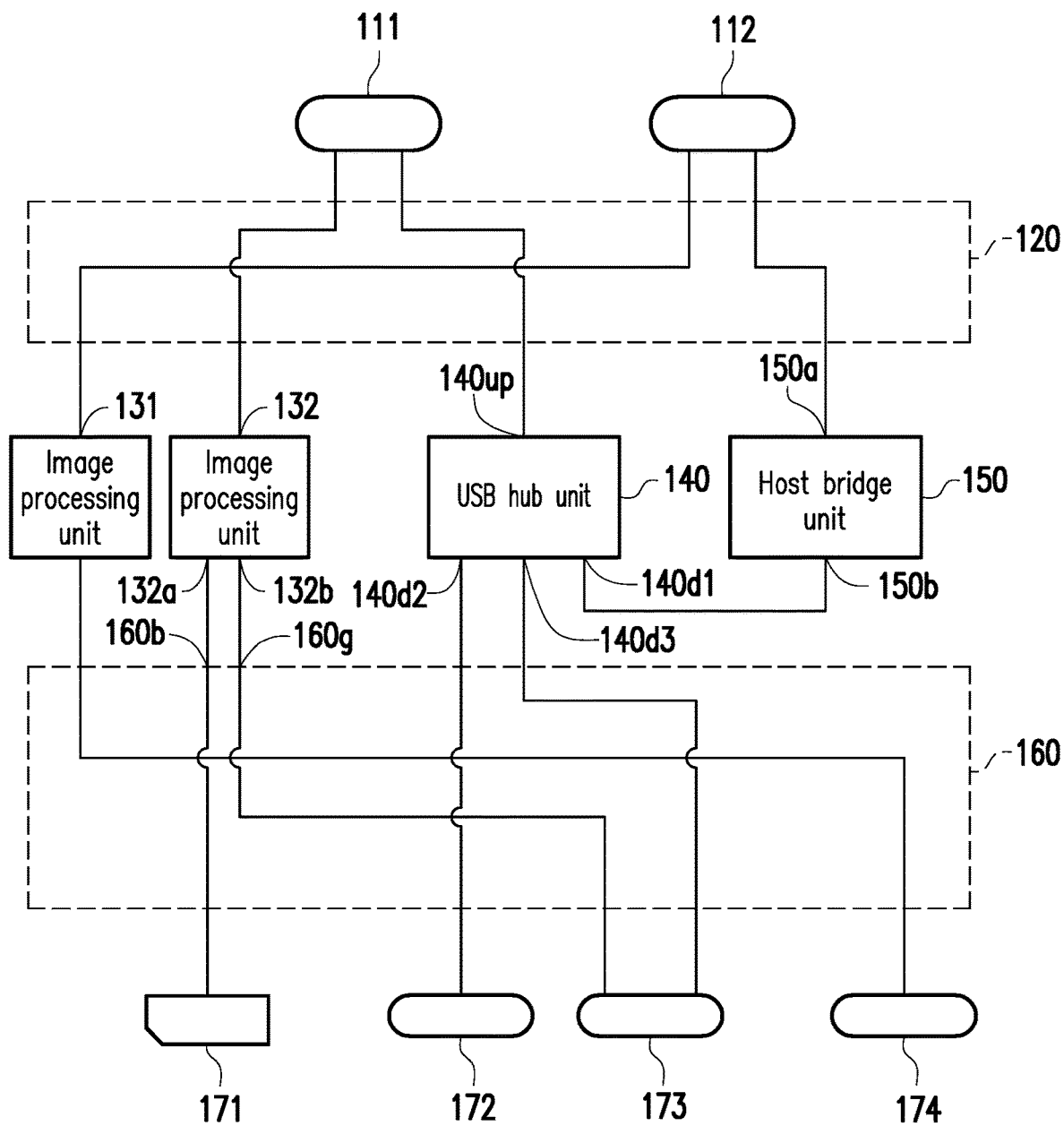
FIGS. 2 to 5 are schematic diagrams showing different operation scenarios of the multiplexers shown in FIG. 1 according to an embodiment of the disclosure.

In the embodiment shown in FIG. 2, the communication protocol transmitted on the USB upstream port 111 and the communication protocol transmitted on the USB upstream port 112 are both in the DP ALT mode. A scenario shown in FIG. 2 is that the USB upstream port 111 is electrically connected to the USB downstream port of an electronic device earlier than the USB upstream port 112.

With reference to FIG. 2, the multiplexer 120 may couple at least one of the data channels of the USB upstream port 111 to the first terminal of the image processing unit 132, and couple the remaining data channels of the USB upstream port 111 to the upstream terminal 140up of the USB hub unit 140 when the USB upstream port 111 is electrically connected to the USB downstream port of the electronic device earlier than the USB upstream port 112. The multiplexer 120 may also couple at least one of the data channels of the USB upstream port 112 to the first terminal of the image processing unit 131, and couple the remaining data channels of the USB upstream port 112 to the connection terminal 150a of the host bridge unit 150.

In the embodiment shown in FIG. 2, the multiplexer 160 may couple the downstream port 171 to the second terminal 132a of the image processing unit 132. The communication protocol transmitted on the downstream port 172 is, for example, in a USB3 mode. Therefore, the multiplexer 160 may couple the downstream port 172 to the downstream terminal 140d2 of the USB hub unit 140. A communication protocol transmitted on the downstream port 173 is in the DP ALT mode. Therefore, the multiplexer 160 may couple at least one of data channels of the downstream port 173 to the third terminal 132b of the image processing unit 132, and couple the remaining data channels of the downstream port 173 to the downstream terminal 140d3 of the USB hub unit 140. A communication protocol transmitted on the downstream port 174 is in the DP ALT mode. Therefore, the multiplexer 160 may couple all data channels of the downstream port 174 to the second terminal of the image processing unit 131.

Figure 3:
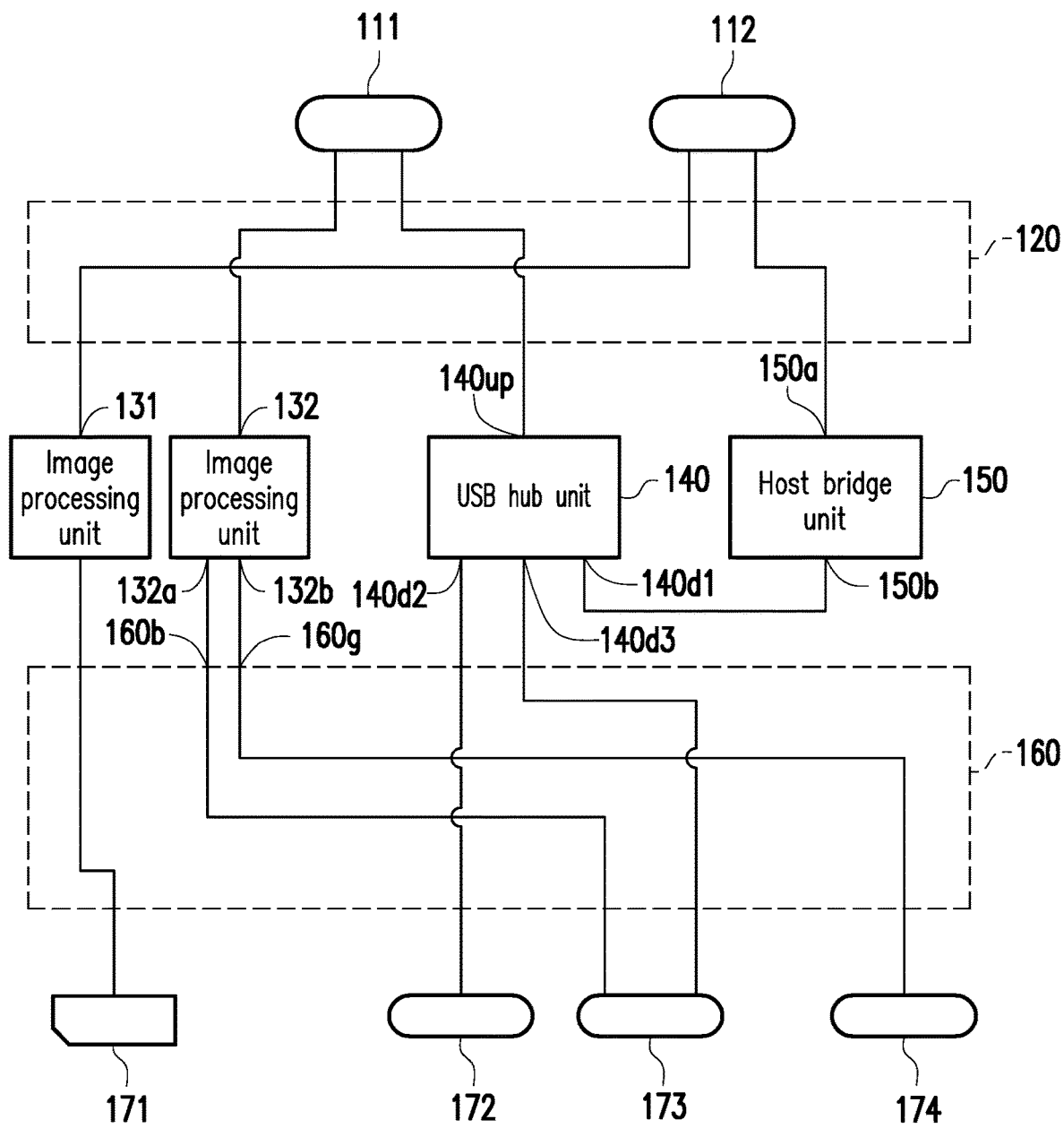

An operation scenario of multiplexer 120 shown in FIG. 3 is that the communication protocol transmitted on the USB upstream port 111 and the communication protocol transmitted on the USB upstream port 112 are both in the DP ALT mode, and the USB upstream port 111 is electrically connected to the USB downstream port of an electronic device earlier than the USB upstream port 112, which is the same as the operation scenario of the multiplexer 120 shown in FIG. 2. Therefore, description of the multiplexer 120 is omitted. In the embodiment shown in FIG. 3, the multiplexer 160 may couple the downstream port 171 to the second terminal of the image processing unit 131. The communication protocol transmitted on the downstream port 172 is in the USB3 mode, therefore the multiplexer 160 may couple the downstream port 172 to the downstream terminal 140d2 of the USB hub unit 140. The communication protocol transmitted on the downstream port 173 is in the DP ALT mode, therefore the multiplexer 160 may couple at least one of the data channels of the downstream port 173 to the second terminal 132a of the image processing unit 132, and couple the remaining data channels of the downstream port 173 to the downstream terminal 140d3 of the USB hub unit 140. The communication protocol transmitted on the downstream port 174 is in the DP ALT mode. Therefore, the multiplexer 160 may couple all of the data channels of the downstream port 174 to the third terminal 132b of the image processing unit 132.

Figure 4:
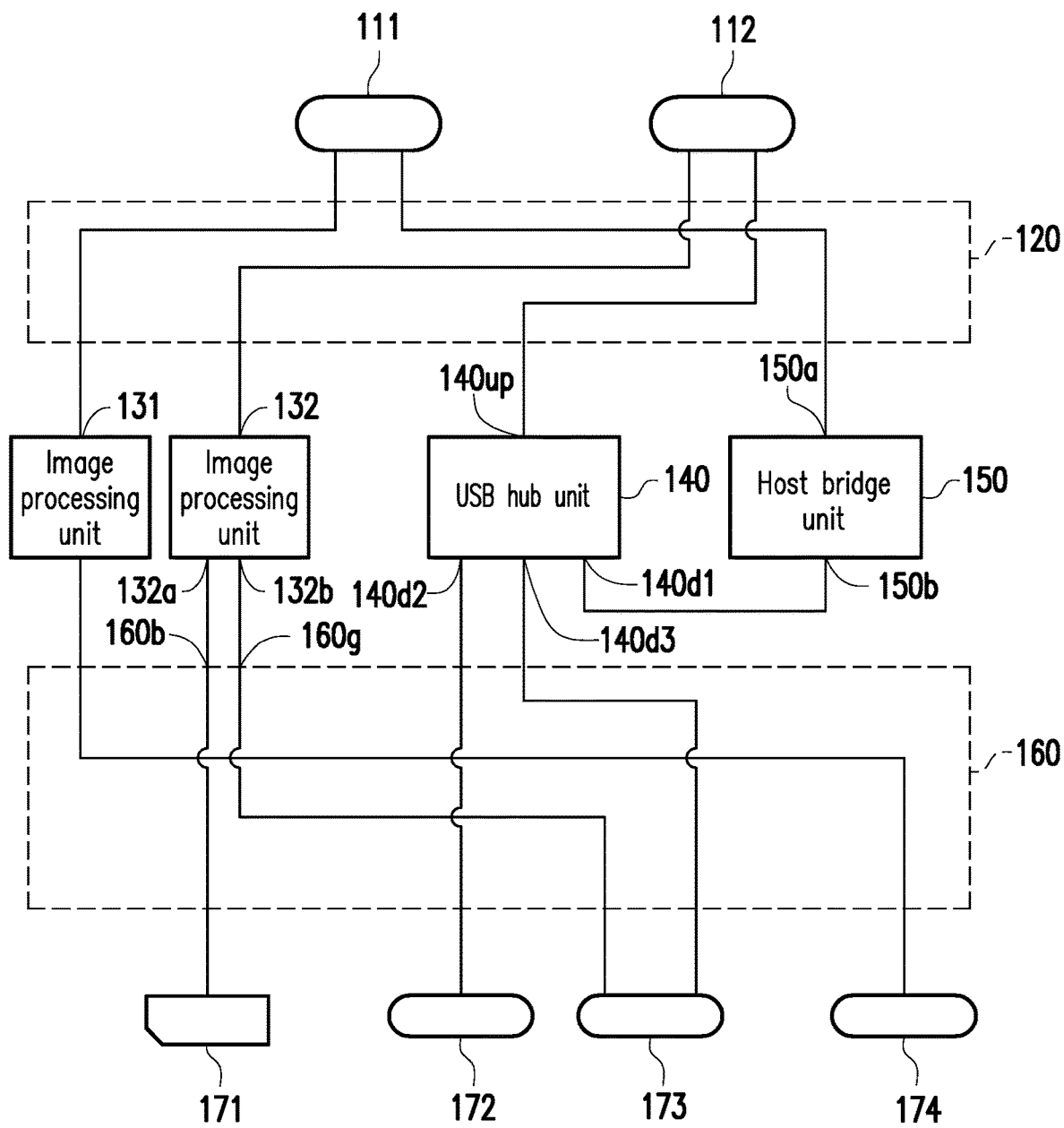

In the embodiment shown in FIG. 4, the communication protocol transmitted on the USB upstream port 111 and the communication protocol transmitted on the USB upstream port 112 are both in the DP ALT mode. A scenario shown in FIG. 4 is that the USB upstream port 112 is electrically connected to the USB downstream port of an electronic device earlier than the USB upstream port 111. With reference to FIG. 4, the multiplexer 120 may first couple at least one of the data channels of the USB upstream port 112 to the first terminal of the image processing unit 132, and couple the remaining data channels of the USB upstream port 112 to the upstream terminal 140up of the USB hub unit 140 when the USB upstream port 112 is electrically connected to the USB downstream port of the electronic device earlier than the USB upstream port 111. The multiplexer 120 may couple at least one of the data channels of the USB upstream port 111 to the first terminal of the image processing unit 131, and couple the remaining data channels of the USB upstream port 111 to the connection terminal 150a of the host bridge unit 150 after the USB upstream port 111 is electrically connected to the USB downstream port of another electronic device. The operation scenario of the multiplexer 160 shown in FIG. 4 is the same as the operation scenario of the multiplexer 160 shown in FIG. 2, therefore description of the multiplexer 160 is omitted.

Figure 5:
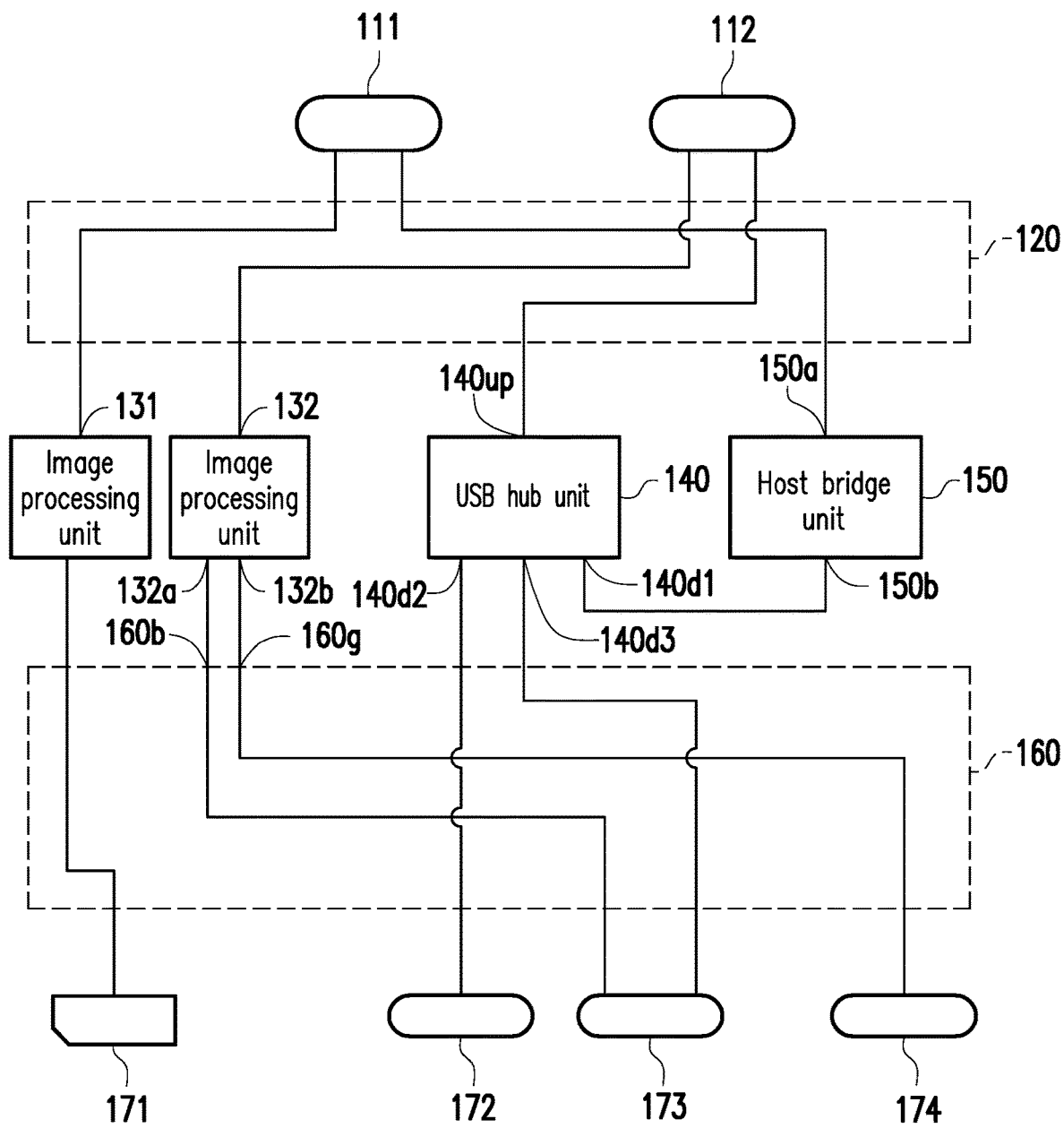

An operation scenario of the multiplexer 120 shown in FIG. 5 is the same as the operation scenario of the multiplexer 120 shown in FIG. 4 when the communication protocol transmitted on the USB upstream port 111 and the communication protocol transmitted on the USB upstream port 112 are both in the DP ALT mode, and the USB upstream port 112 is electrically connected to the USB downstream port of an electronic device earlier than the USB upstream port 111, therefore the description of the multiplexer 120 is omitted. In addition, the operation scenario of the multiplexer 160 shown in FIG. 5 is also the same as the operation scenario of the multiplexer 160 shown in FIG. 3, therefore the description of the multiplexer 160 is omitted here.

Furthermore, in the embodiment, the multiplexer 120 may, for example, couple at least one of the data channels of the USB upstream port that is electrically connected to the electronic device first to the image processing unit 132. The image processing unit 132 includes, for example, a DP MST function that conforms to the DP specification. On the other hand, at least one of the data channels of the USB upstream port that is electrically connected to the electronic device later is coupled to the image processing unit 131. The image processing unit 131 is, for example, a DP repeater unit that conforms to the DP specification. Of course, in other preferred implementations, a coupling relationship between the data channels of the USB upstream port, the image processing unit 131 and the image processing unit 132 may be adjusted according to design requirements, and is not limited by the disclosure.

Figure 6:
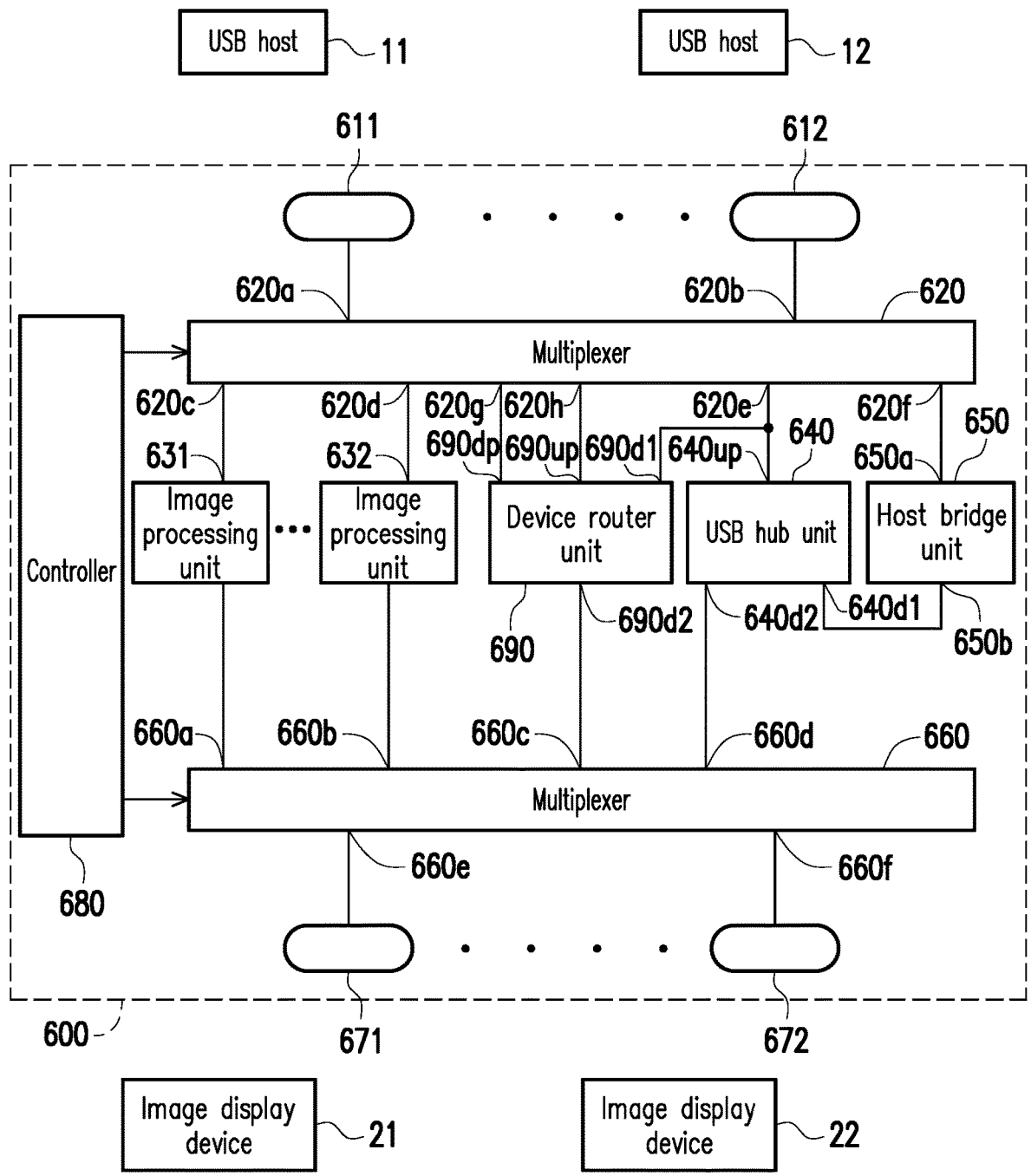
FIG. 6 is a schematic block diagram of a circuit block of a multi-image output system and a USB hub thereof according to another embodiment of the disclosure.

FIG. 6 is a schematic block diagram of a circuit of a multi-video output system and a USB hub 600 thereof according to another embodiment of the disclosure. The multi-image output system shown in FIG. 6 includes the USB host 11, the USB host 12, the USB hub 600, the image display device 21, and the image display device 22. The USB hub 600 shown in FIG. 6 includes a controller 680, a multiplexer (path switching circuit) 620, a multiplexer (path switching circuit) 660, a USB hub unit 640, a host bridge unit 650, a device router unit 690, multiple USB upstream ports (such as 611 and 612), multiple downstream ports (such as 671 and 672), and multiple image processing units (such as 631 and 632). The USB hub 600 provides the multiple image processing units 631 and 632, to enable the transmission of the image data of the USB upstream ports 611 and 612 to be independent of each other. In some embodiments, the image processing unit 631 and/or 632 may include a DP circuit that conforms to the DP protocol. For example, the image processing unit 631 may be a DP repeater unit (such as an LTTPR circuit) that conforms to the DP specification, and the image processing unit 632 may include a DP MST image processing unit that conforms to the DP specification.

The downstream port 671 and/or the downstream port 672 may include a USB downstream port, such as a USB type-C connector or other USB connectors. The downstream port 671 and the downstream port 672 may be connected to different USB devices (such as a monitor, a keyboard, or other peripheral devices, which are not shown) or other types of imaging devices (such as the image display devices 21 and 22). In some embodiments, at least one of the downstream port 671 to the downstream port 672 may be an image output port (such as a DP connector), and other connector of the downstream port 671 to the downstream port 672 may be a USB connector, according to the actual design. The DP connector may be connected to a DP device (such as a display or other DP devices, which is not shown). That is, the image display device 21 and the image display device 22 may be coupled to the image output port and two of the downstream ports.

Reference may be made to the relevant descriptions of the USB hub 100, the controller 180, the multiplexer 120, the multiplexer 160, the USB hub unit 140, the host bridge unit 150, the USB upstream port 111, the USB upstream port 112, the downstream port 171, the downstream port 172, the image processing unit 131, and the image processing unit 132 shown in FIGS. 1 to 5 and deduced analogy for the USB hub 600, the controller 680, the multiplexer 620, the multiplexer 660, the USB hub unit 640, the host bridge unit 650, the USB upstream port 611, the USB upstream port 612, the downstream port 671, the downstream port 672, the image processing unit 631 and the image processing unit 632 shown in FIG. 6, which are not omitted. In the embodiment, the device router unit 690 is coupled to the image processing unit 631, the image processing unit 632, and the USB hub unit 640.

The multiplexer 620 shown in FIG. 6 has multiple connection terminals, such as connection terminals 620a, 620b, 620c, 620d, 620e, 620f, 620g, and 620h. The connection terminal 620a is coupled to the USB upstream port 611. The connection terminal 620b is coupled to the USB upstream port 612. The connection terminal 620c is coupled to a first terminal of the image processing unit 631. The connection terminal 620d is coupled to a first terminal of the image processing unit 632. The connection terminal 620h is coupled to a USB4 upstream terminal 690up of the device router unit 690. The connection terminal 620g is coupled to an image terminal 690dp of the device router unit 690. The connection terminal 620e is coupled to an upstream terminal 640up of the USB hub unit 640. The upstream terminal 640up of the USB hub unit 640 is also coupled to a USB3 downstream terminal 690d1 of the device router unit 690. The USB hub unit 640 and the device router unit 690 are respectively a hub unit and a device router unit that conforms to a USB4 specification, therefore the implementation details of the USB hub unit 640 and the device router unit 690 are omitted. The downstream terminal 640d1 of the USB hub unit 640 is coupled to a connection terminal 650b of the host bridge unit 650. The connection terminal 620f is coupled to a connection terminal 650a of the host bridge unit 650.

The controller 680 may control a connection route of the multiplexer 620 according to communication protocols transmitted on the USB upstream port 611 and/or the USB upstream port 612. For example, the multiplexer 620 may couple at least one of data channels of the USB upstream port 611 to the first terminal of one of the image processing unit 631 and the image processing unit 632, and couple at least one of data channels of the USB upstream port 612 to the first terminal of the other of the image processing unit 631 and the image processing unit 632 when the communication protocol transmitted on the USB upstream port 611 and the communication protocol of transmission of the USB upstream port 612 are both in the DP ALT mode. In another example, the multiplexer 620 may couple at least one of the data channels of the USB upstream port 611 to the first terminal of one of the image processing unit 631 and the image processing unit 632 when the communication protocol transmitted on the USB upstream port 611 is in the DP ALT mode and the communication protocol transmitted on the USB upstream port 612 is not in the DP ALT mode. The data channel is a differential pin pair (high-speed data transmission channel) of the USB upstream port, such as the D+ and D− pin pair, the TX1+ and TX1− pin pair, the RX1+ and RX1− pin pair, the TX2+ and TX2− pin pair, and/or the RX2+ and RX2− pin pair specified by the USB specification.

The multiplexer 660 shown in FIG. 6 has multiple connection terminals, such as connection terminals 660a, 660b, 660c, 660d, 660e, and 660f. The connection terminal 660a is coupled to a second terminal of the image processing unit 631. The connection terminal 660b is coupled to a second terminal of the image processing unit 632. The connection terminal 660c is coupled to a USB4 downstream terminal 690d2 of the device router unit 690. The connection terminal 660d is coupled to a downstream terminal 640d2 of the USB hub unit 640. The connection terminal 660e is coupled to the downstream port 671. The connection terminal 660f is coupled to the downstream port 672.

The controller 680 may also control a connection route of the multiplexer 660 according to communication protocols transmitted on the downstream port 671 and/or the downstream port 672. For example, the multiplexer 660 may couple at least one of data channels of the downstream port 671 to the second terminal of one of the image processing unit 631 and the image processing unit 632, and couple at least one of data channels of the downstream port 672 to the second terminal of the other of the image processing unit 631 and the image processing unit 632 when the communication protocol transmitted on the downstream port 671 and the communication protocol transmitted on the downstream port 672 are both in the DP ALT mode.

FIGS. 7 to 14 are schematic diagrams showing different operation scenarios of the multiplexers 620 and 660 shown in FIG. 6 according to an embodiment of the disclosure. In the embodiment shown in FIGS. 7 to 14, the number of the USB upstream ports is assumed to be two (that is, the USB upstream port 611 and the USB upstream port 612 shown in FIGS. 7 to 14), and the number of the downstream connection is assumed to be four (that is, the downstream port 671, the downstream port 672, a downstream port 673, and a downstream port 674 shown in FIGS. 7 to 14). In the embodiment shown in FIGS. 7 to 14, the downstream port 671 is a DP connector, and the downstream ports 672, 673, and 674 are USB connectors (such as a USB type-C connector).

In the embodiment shown in FIGS. 7 to 14, the image processing unit 632 may include a DP MST function that conforms to the DP specification. Therefore, the image processing unit 632 has a second terminal 632a and a third terminal 632b. The connection terminal 660b of the multiplexer 660 is coupled to the second terminal 632a of the image processing unit 632. The connection terminal 660g of the multiplexer 660 is coupled to the third terminal 632b of the image processing unit 632.

Figure 7:
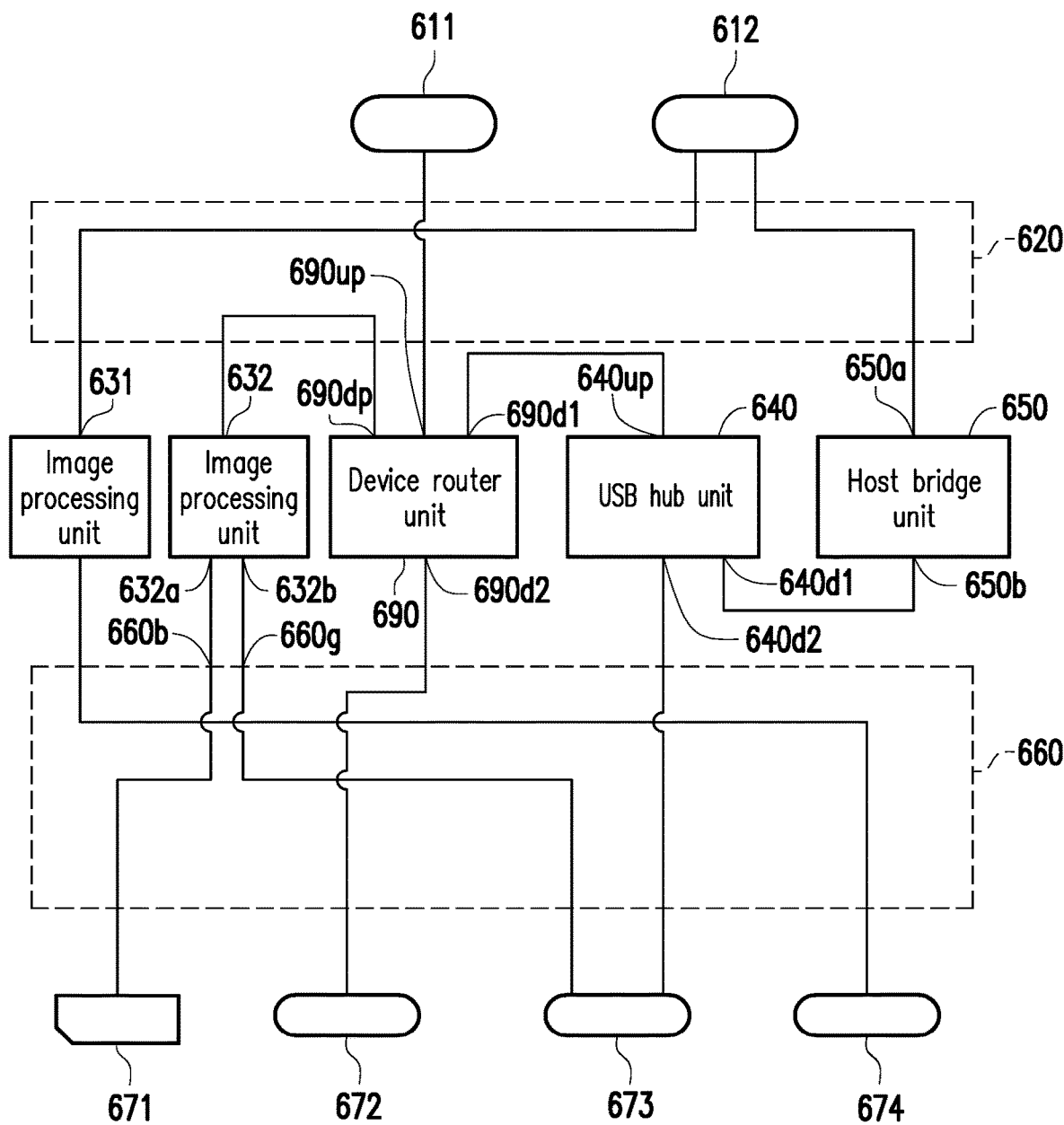
FIGS. 7 to 14 are schematic diagrams showing different operation scenarios of the multiplexer shown in FIG. 6 according to an embodiment of the disclosure.

In the embodiment shown in FIG. 7, the communication protocol transmitted on the USB upstream port 611 is the USB4 protocol, and the communication protocol transmitted on the USB upstream port 612 is in the DP ALT mode. A scenario shown in FIG. 7 is that the USB upstream port 611 is electrically connected to the USB downstream port of an electronic device earlier than the USB upstream port 612. Because the USB upstream port 611 is connected to the electronic device first, the multiplexer 620 may couple all of the data channels of the USB upstream port 611 to the USB4 upstream terminal 690up of the device router unit 690. As for the USB downstream port 612 that is connected to the electronic device later, the multiplexer 620 couples at least one of the data channels of the USB upstream port 612 to the first terminal of the image processing unit 631, and couples the remaining data channels of the USB upstream port 612 to the connection terminal 150a of the host bridge unit 650. In addition, a multiplexer circuit of the multiplexer 620 may couple the image terminal 690dp of the device router unit 690 to the first terminal of the image processing unit 632. Therefore, the multiplexer 620 may couple the data channels of the USB upstream port 611 to the first terminal of the image processing unit 632 through the device router unit 690, and directly couple at least one of the data channels of the USB upstream port 612 to the first terminal of the image processing unit 631.

It should be noted that the multiplexer circuit of the multiplexer 620 couples the image terminal 690dp of the device router unit 690 to the first terminal of the image processing unit 632 in the operation scenario of FIG. 7. However, the multiplexer circuit of the multiplexer 620 may couple the image terminal 690dp of the device router unit 690 to the first terminal of the image processing unit 631 in other operation scenarios. The multiplexer circuit between the image terminal 690dp and the image processing units (631 and 632) is incorporated into the multiplexer 620 according to the embodiments shown in FIGS. 6 to 14. In other preferred embodiments, the multiplexer circuit between the image terminal 690dp and the image processing units (631 and 632) may also be independent of the multiplexer 620, and is not limited by the disclosure.

In the embodiment shown in FIG. 7, the multiplexer 660 may couple the downstream port 671 to the second terminal 632a of the image processing unit 632. It is assumed that the communication protocol transmitted on the downstream port 672 is the USB4 protocol. Therefore, the multiplexer 660 may couple the downstream port 672 to the USB4 downstream terminal 690d2 of the device router unit 690. It is assumed that a communication protocol transmitted on the downstream port 673 is in the DP ALT mode. Therefore, the multiplexer 660 may couple at least one of data channels of the downstream port 673 to the third terminal 632b of the image processing unit 632, and couple the remaining data channels of the downstream port 673 to the downstream terminal 640d2 of the USB hub unit 640. It is assumed that a communication protocol transmitted on the downstream port 674 is in the DP ALT mode. Therefore, the multiplexer 660 may couple all data channels of the downstream port 674 to the second terminal of the image processing unit 631.

Figure 8:
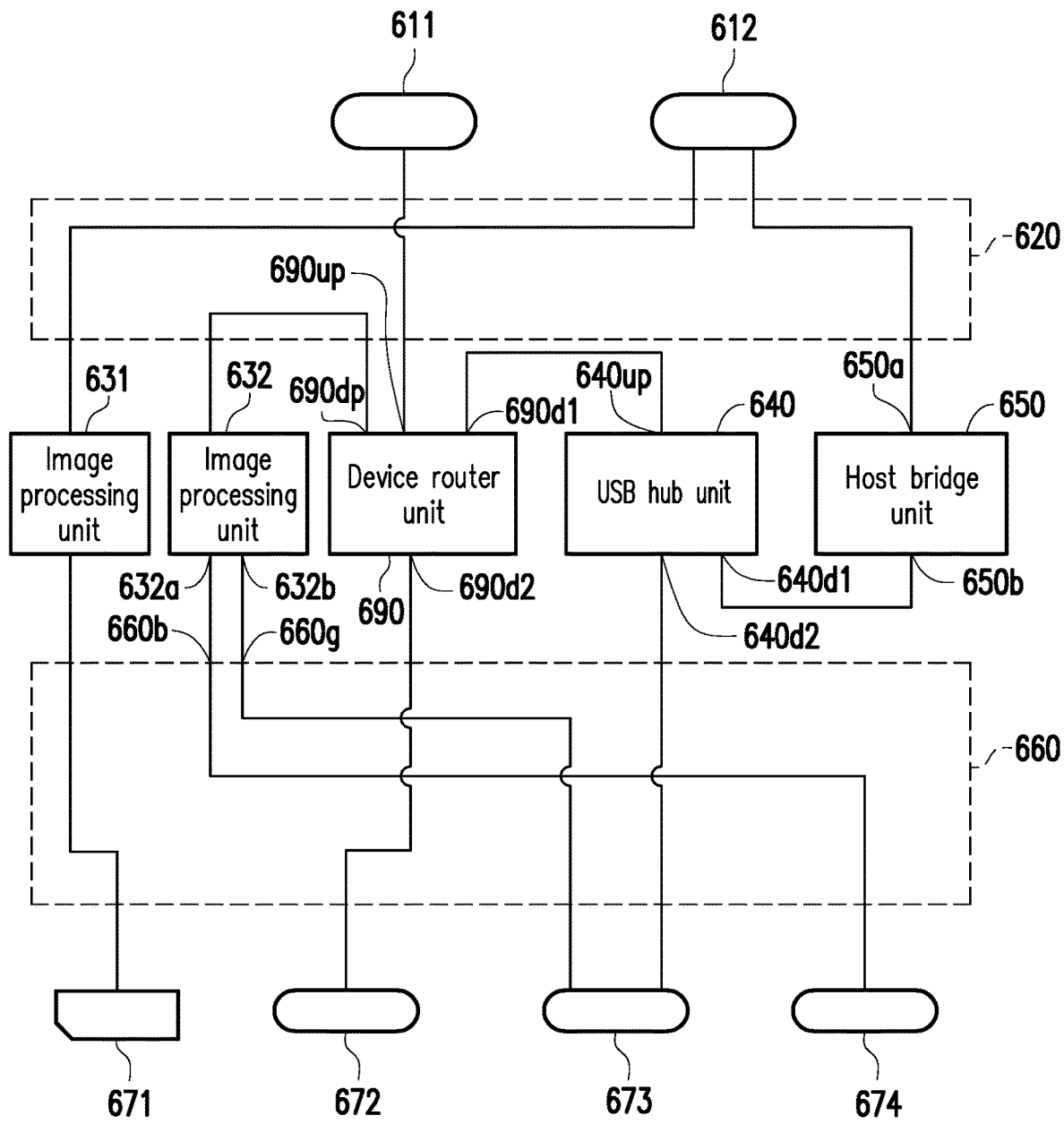

An operation scenario of the multiplexer 620 shown in FIG. 8 is that the communication protocol transmitted on the USB upstream port 611 is the USB4 protocol, and the communication protocol transmitted on the USB upstream port 612 is in the DP ALT mode. In addition, the USB upstream port 611 is electrically connected to the USB downstream port of an electronic device earlier than the USB upstream port 612. The operation scenario of the multiplexer 620 shown in FIG. 8 is the same as the operation scenario of the multiplexer 620 shown in FIG. 7, therefore description of the multiplexer 620 is omitted. In the embodiment shown in FIG. 8, the multiplexer 660 may couple the downstream port 671 to the second terminal of the image processing unit 631. It is assumed that the communication protocol transmitted on the downstream port 672 is the USB4 protocol. Therefore, the multiplexer 660 may couple the downstream port 672 to the USB4 downstream terminal 690d2 of the device router unit 690. It is assumed that the communication protocol transmitted on the downstream port 673 is in the DP ALT mode. Therefore, the multiplexer 660 may couple at least one of the data channels of the downstream port 673 to the third terminal 632b of the image processing unit 632, and couple the remaining data channels of the downstream port 673 to the downstream terminal 640d2 of the USB hub unit 640. It is assumed that the communication protocol transmitted on the downstream port 674 is in the DP ALT mode. Therefore, the multiplexer 660 may couple all of the data channels of the downstream port 674 to the second terminal 632a of the image processing unit 632.

Figure 9:
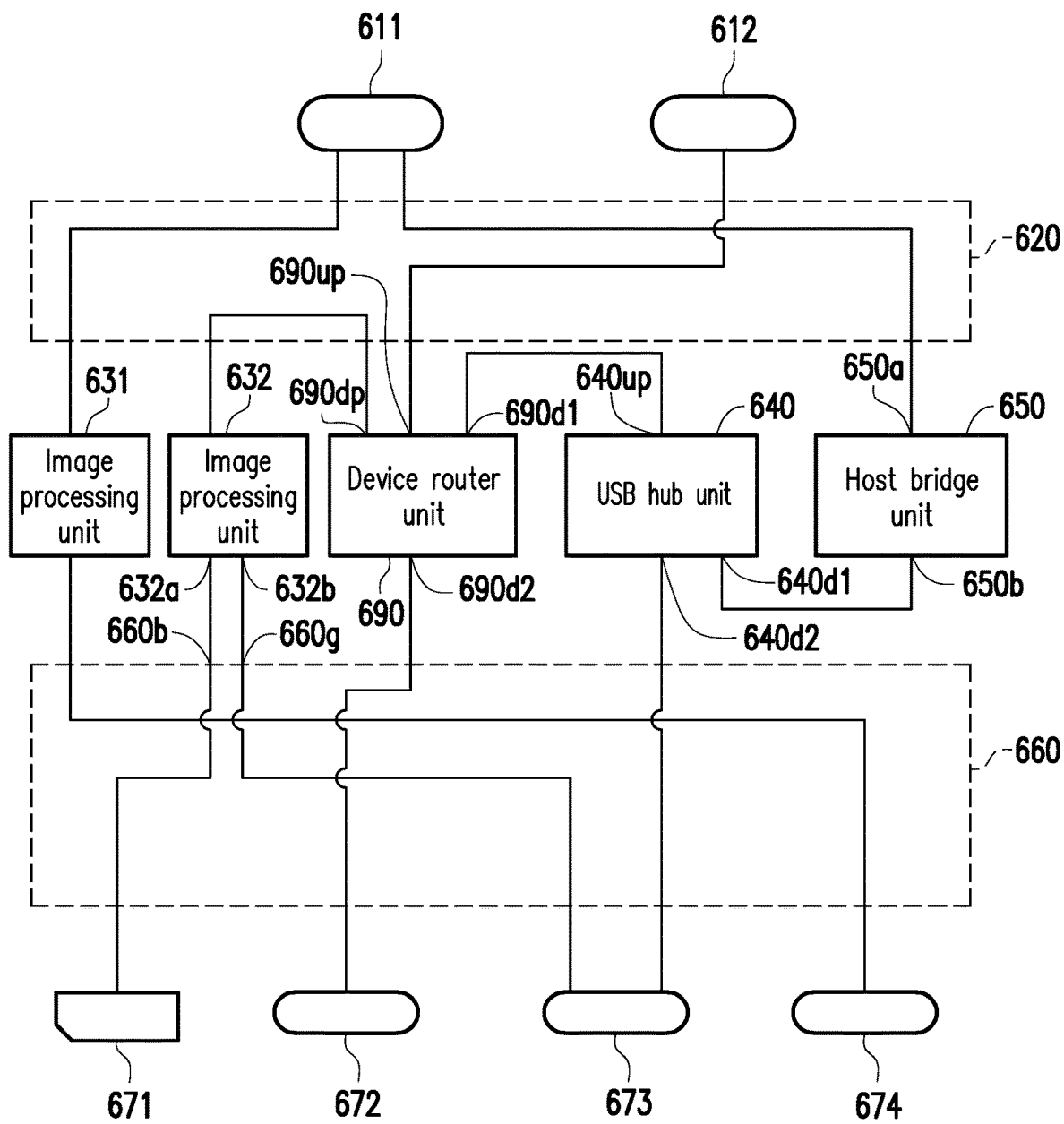

In the embodiment shown in FIG. 9, the communication protocol transmitted on the USB upstream port 611 is in the DP ALT mode, and the communication protocol transmitted on the USB upstream port 112 is the USB4 protocol. A scenario shown in FIG. 9 is that the USB upstream port 612 is electrically connected to the USB downstream port of an electronic device earlier than the USB upstream port 611. Because the USB upstream port 612 is connected to the electronic device first, the multiplexer 620 may couple all of the data channels of the USB upstream port 612 to the USB4 upstream terminal 690up of the device router unit 690. As for the USB downstream port 611 that is electrically connected to the electronic device later, the multiplexer 620 may couple at least one of the data channels of the USB upstream port 611 to the first terminal of the image processing unit 631 and couple the remaining data channels of the USB upstream port 611 to the connection terminal 650a of the host bridge unit 650. In addition, the multiplexer 620 may couple the image terminal 690dp of the device router unit 690 to the first terminal of the image processing unit 632. Therefore, the multiplexer 620 may couple the data channels of the USB upstream port 612 to the first terminal of the image processing unit 632 through the device router unit 690, and directly couple at least one of the data channels of the USB upstream port 611 to the first terminal of the image processing unit 631. In addition, the operation scenario of the multiplexer 660 shown in FIG. 9 is the same as the operation scenario of the multiplexer 660 shown in FIG. 7, therefore description of the multiplexer 660 is omitted.

Figure 10:
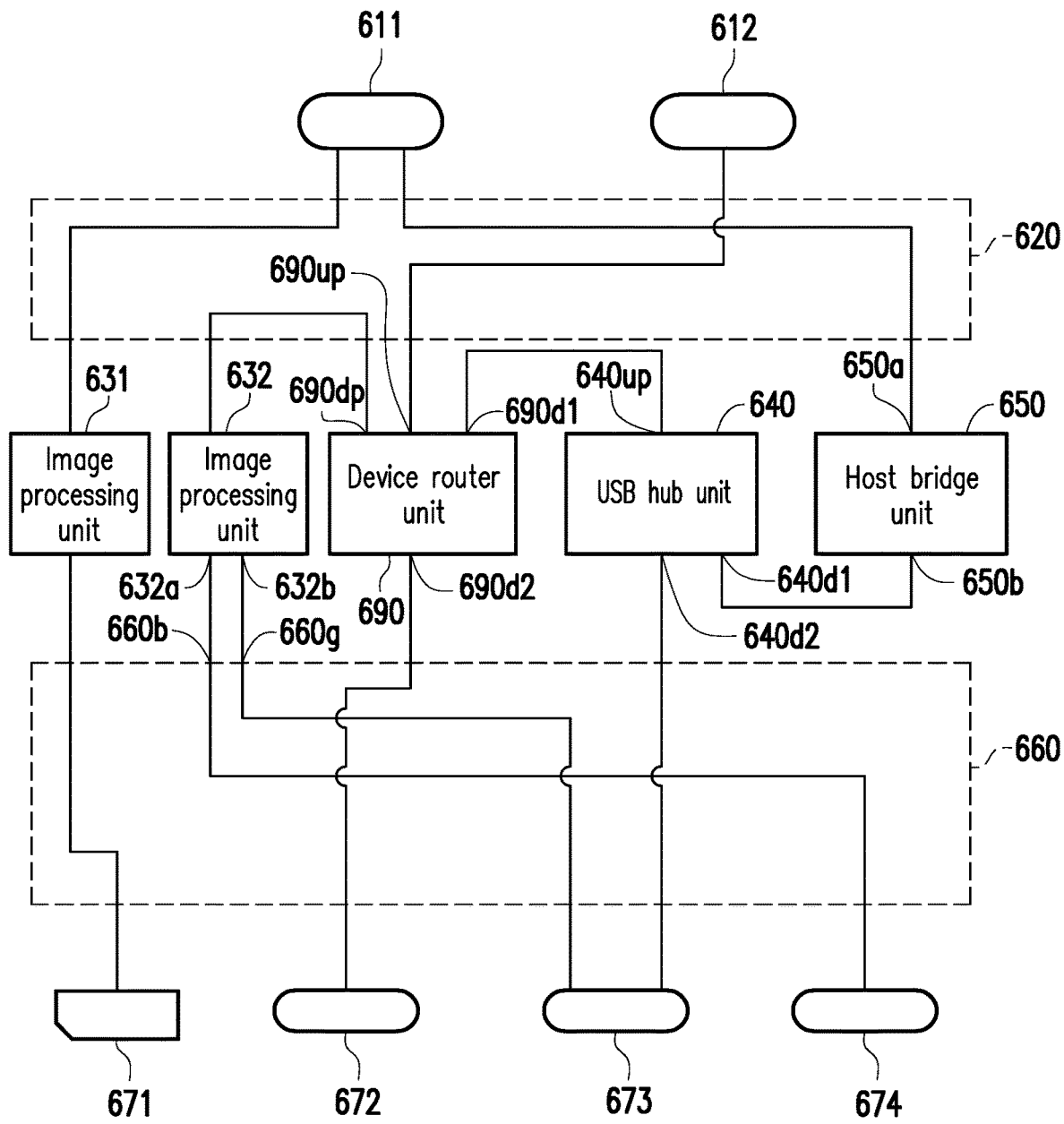

An operation scenario of the multiplexer 620 shown in FIG. 10 is also that the communication protocol transmitted on the USB upstream port 611 is in the DP ALT mode, the communication protocol transmitted on the USB upstream port 112 is the USB4 protocol, and the USB upstream port 612 is electrically connected to the USB downstream port of an electronic device earlier than the USB upstream port 611, which is the same as the operation scenario of the multiplexer 620 shown in FIG. 9, therefore the description of the multiplexer 620 is omitted. The operation scenario of the multiplexer 660 shown in FIG. 10 is the same as the operation scenario of the multiplexer 660 shown in FIG. 8, therefore the description of the multiplexer 660 is omitted again.

As in the above-mentioned embodiments, the multiplexer 620 according to the embodiment may also, for example, couple at least one of the data channels of the USB upstream port that is electrically connected to the electronic device first to the image processing unit 632. The image processing unit 632 includes, for example, a DP MST function that conforms to the DP specification. On the other hand, at least one of the data channels of the USB upstream port that is electrically connected to the electronic device later is coupled to the image processing unit 631. The image processing unit 631 is, for example, a DP repeater unit that conforms to the DP specification. Of course, in other preferred implementations, a coupling relationship between the data channels of the USB upstream ports, the image processing unit 631, and the image processing unit 632 may be adjusted according to the design requirements, and is not limited by the disclosure.

FIGS. 11 to 14 show implementations of the implementation architecture of FIGS. 7 to 10 when the communication protocols transmitted on the USB upstream port 111 and the USB upstream port 112 are in the DP ALT mode. In the embodiment shown in FIGS. 11 to 14, the USB hub unit 640 further includes a downstream terminal 640d3. The downstream terminal 640d2 of the USB hub unit 640 is coupled to the connection terminal 660d of the multiplexer 660. The downstream terminal 640d3 of the USB hub unit 640 is coupled to a connection terminal 660h of the multiplexer 660.

Figure 11:
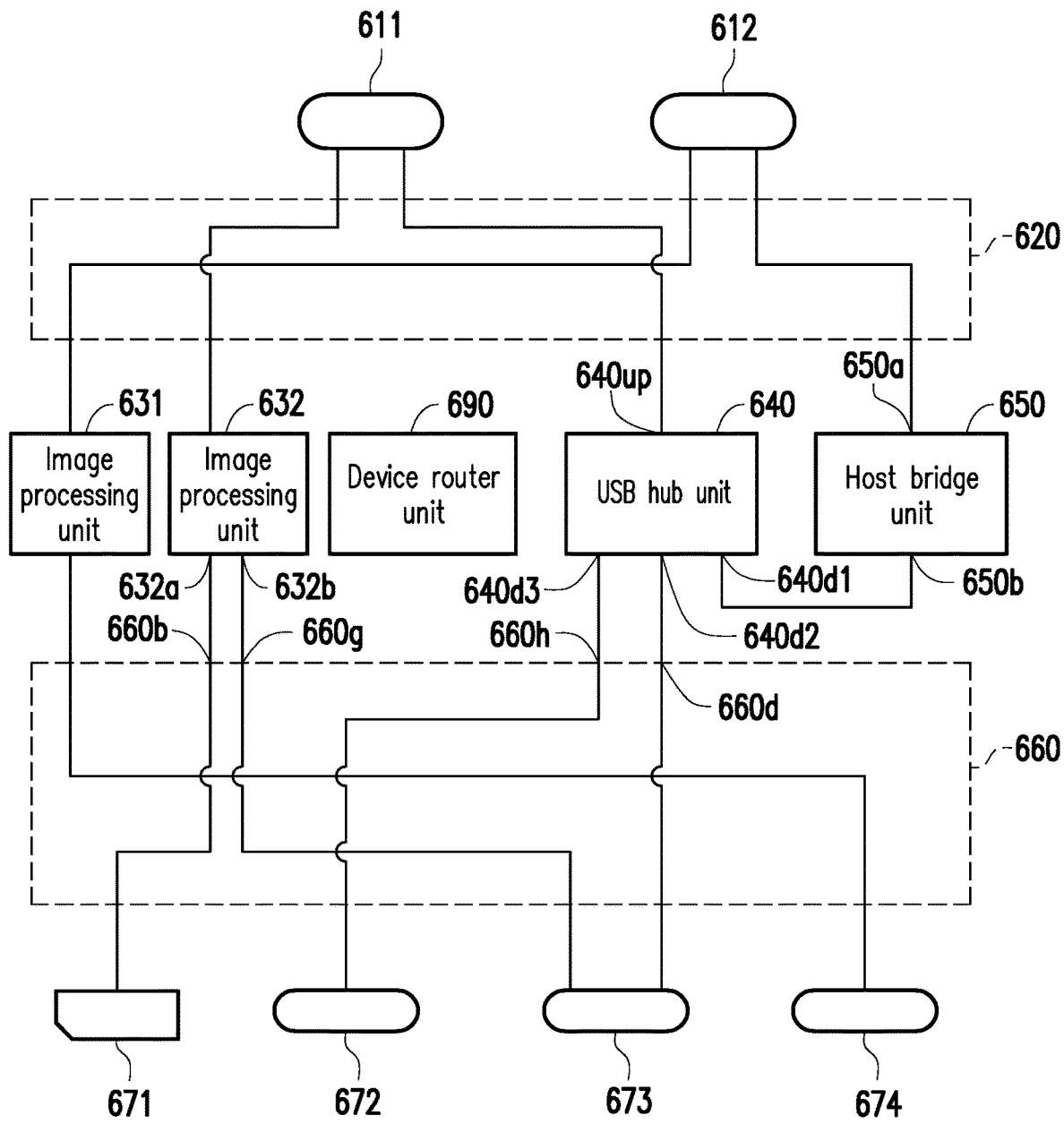

In the embodiment shown in FIG. 11, the communication protocol transmitted on the USB upstream port 611 and the communication protocol transmitted on the USB upstream port 612 are both in the DP ALT mode. A scenario shown in FIG. 11 is that the USB upstream port 611 is electrically connected to the USB downstream port of an electronic device earlier than the USB upstream port 612. The multiplexer 620 may couple at least one of the data channels of the USB upstream port 611 to the first terminal of the image processing unit 632, and couple the remaining data channels of the USB upstream port 611 to the upstream terminal 640up of the USB hub unit 640 when the USB upstream port 611 is electrically connected to the USB downstream port of the electronic device earlier than the USB upstream port 612. The multiplexer 620 may also couple at least one of the data channels of the USB upstream port 612 to the first terminal of the image processing unit 631, and couple the remaining data channels of the USB upstream port 612 to the connection terminal 650a of the host bridge unit 650.

In the embodiment shown in FIG. 11, the multiplexer 660 may couple the downstream port 671 to the second terminal 632a of the image processing unit 632. It is assumed that the communication protocol transmitted on the downstream port 672 is in the USB3 mode. Therefore, the multiplexer 660 may couple the downstream port 672 to the downstream terminal 640d3 of the USB hub unit 640. It is assumed that the communication protocol transmitted on the downstream port 673 is in the DP ALT mode. Therefore, the multiplexer 660 may couple at least one of the data channels of the downstream port 673 to the third terminal 632b of the image processing unit 632, and couple the remaining data channels of the downstream port 673 to the downstream terminal 640d2 of the USB hub unit 640. It is assumed that the communication protocol transmitted on the downstream port 674 is in the DP ALT mode. Therefore, the multiplexer 660 may couple all of the data channels of the downstream port 674 to the second terminal of the image processing unit 631.

Figure 12:
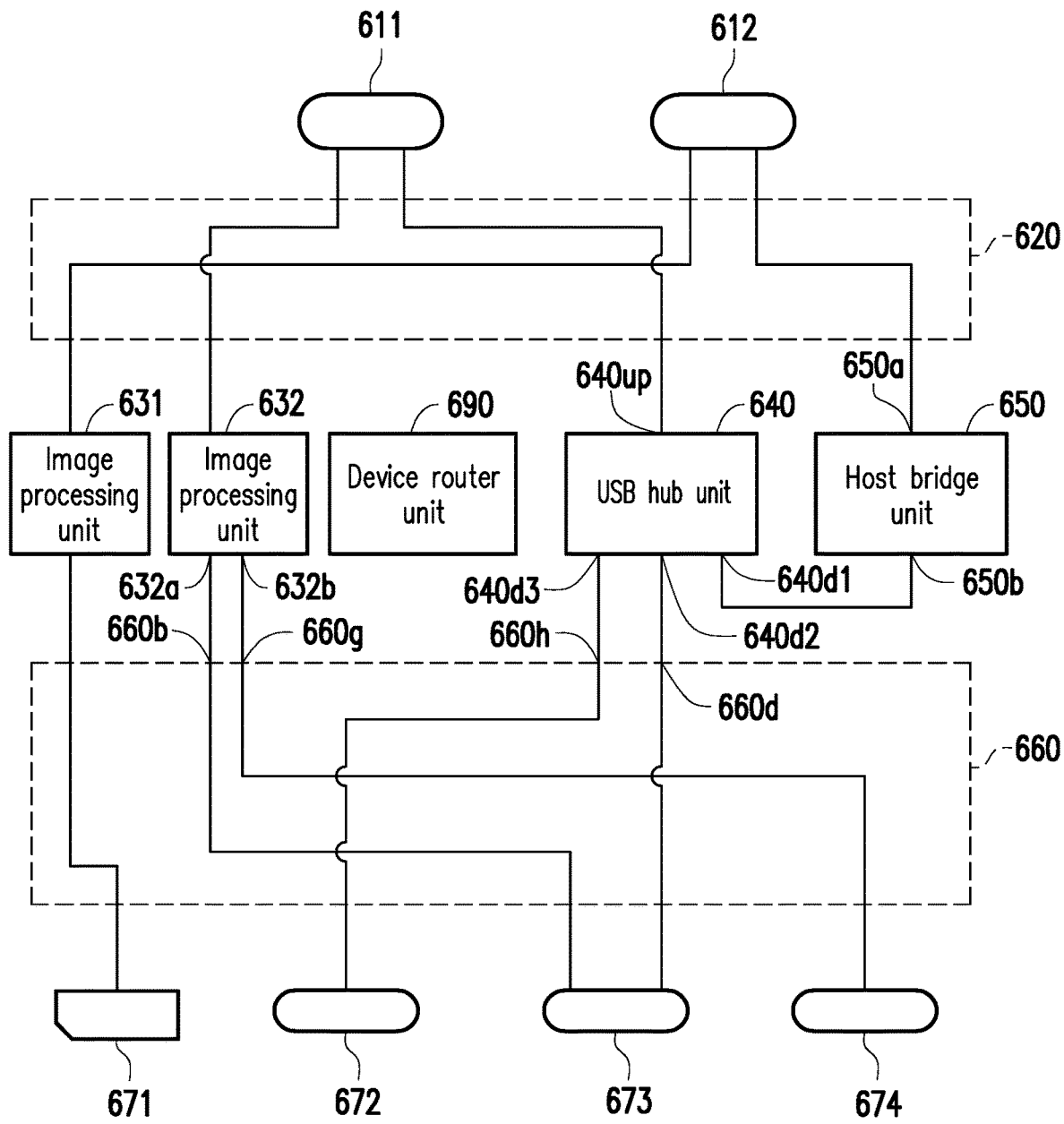

An operation scenario of the multiplexer 620 shown in FIG. 12 is the same as the operation scenario of the multiplexer 620 shown in FIG. 11, therefore the description of the multiplexer 620 is omitted. In the embodiment shown in FIG. 12, the multiplexer 660 may couple the downstream port 671 to the second terminal of the image processing unit 631. It is assumed that the communication protocol transmitted on the downstream port 672 is in the USB3 mode. Therefore, the multiplexer 660 may couple the downstream port 672 to the downstream terminal 640d3 of the USB hub unit 640. It is assumed that the communication protocol transmitted on the downstream port 673 is in the DP ALT mode. Therefore, the multiplexer 660 may couple at least one of the data channels of the downstream port 673 to the second terminal 632a of the image processing unit 632, and couple the remaining data channels of the downstream port 673 to the downstream terminal 640d2 of the USB hub unit 640. It is assumed that the communication protocol transmitted on the downstream port 674 is in the DP ALT mode. Therefore, the multiplexer 660 may couple all of the data channels of the downstream port 674 to the third terminal 632b of the image processing unit 632.

Figure 13:
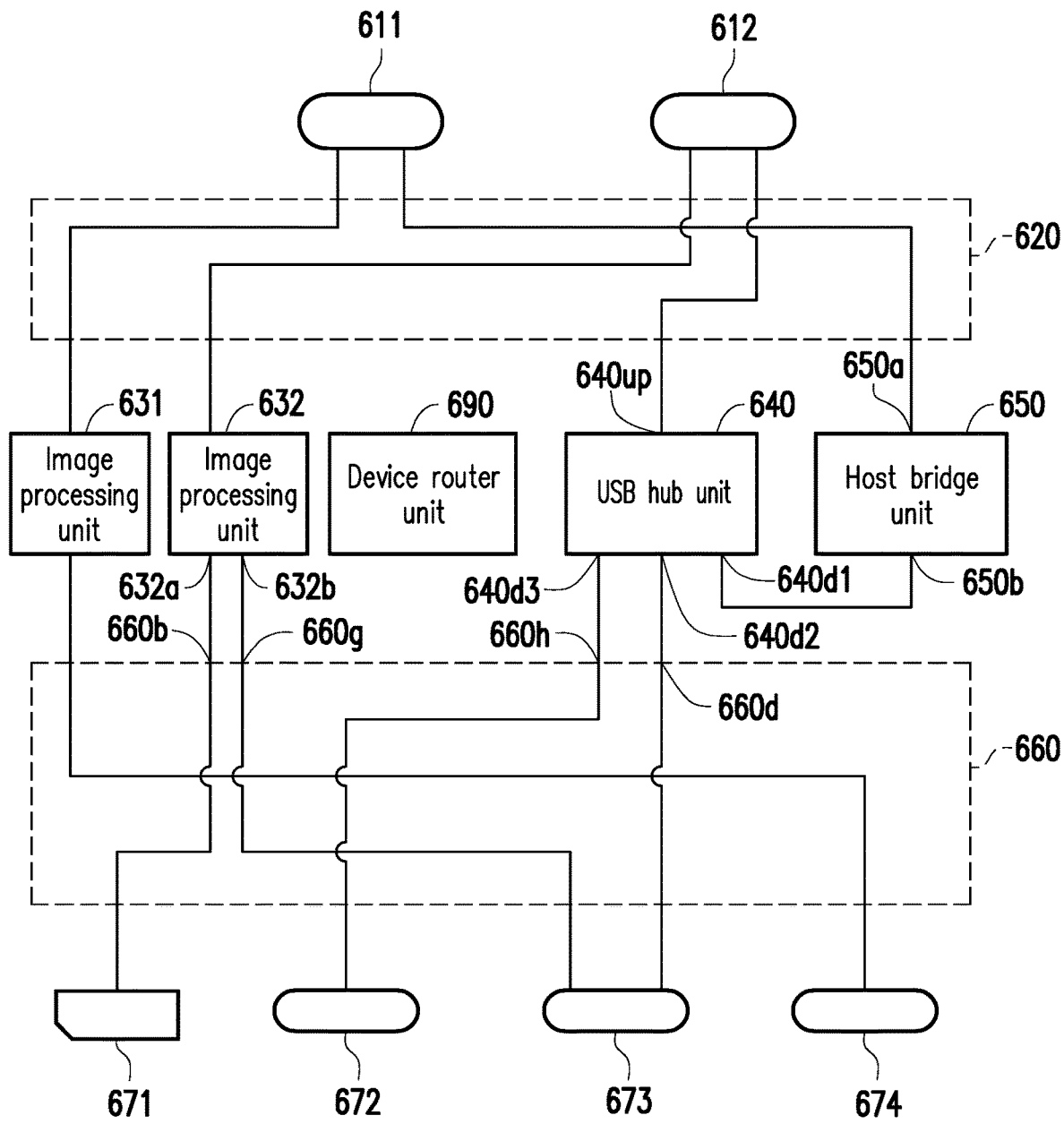

In the embodiment shown in FIG. 13, the communication protocol transmitted on the USB upstream port 611 and the communication protocol transmitted on the USB upstream port 612 are both in the DP ALT mode. A scenario shown in FIG. 13 is that the USB upstream port 612 is electrically connected to the USB downstream port of an electronic device earlier than the USB upstream port 611. The multiplexer 620 may couple at least one of the data channels of the USB upstream port 611 to the first terminal of the image processing unit 631, and couple the remaining data channels of the USB upstream port 611 to the connection terminal 650a of the host bridge unit 650 when the USB upstream port 612 is electrically connected to the USB downstream port of the electronic device earlier than the USB upstream port 611. The multiplexer 620 may also couple at least one of the data channels of the USB upstream port 612 to the first terminal of the image processing unit 632, and couple the remaining data channels of the USB upstream port 612 to the upstream terminal 640up of the USB hub unit 640. The operation scenario of the multiplexer 660 shown in FIG. 13 is the same as the operation scenario of the multiplexer 660 shown in FIG. 11, therefore the description of the multiplexer 660 is omitted.

Figure 14:
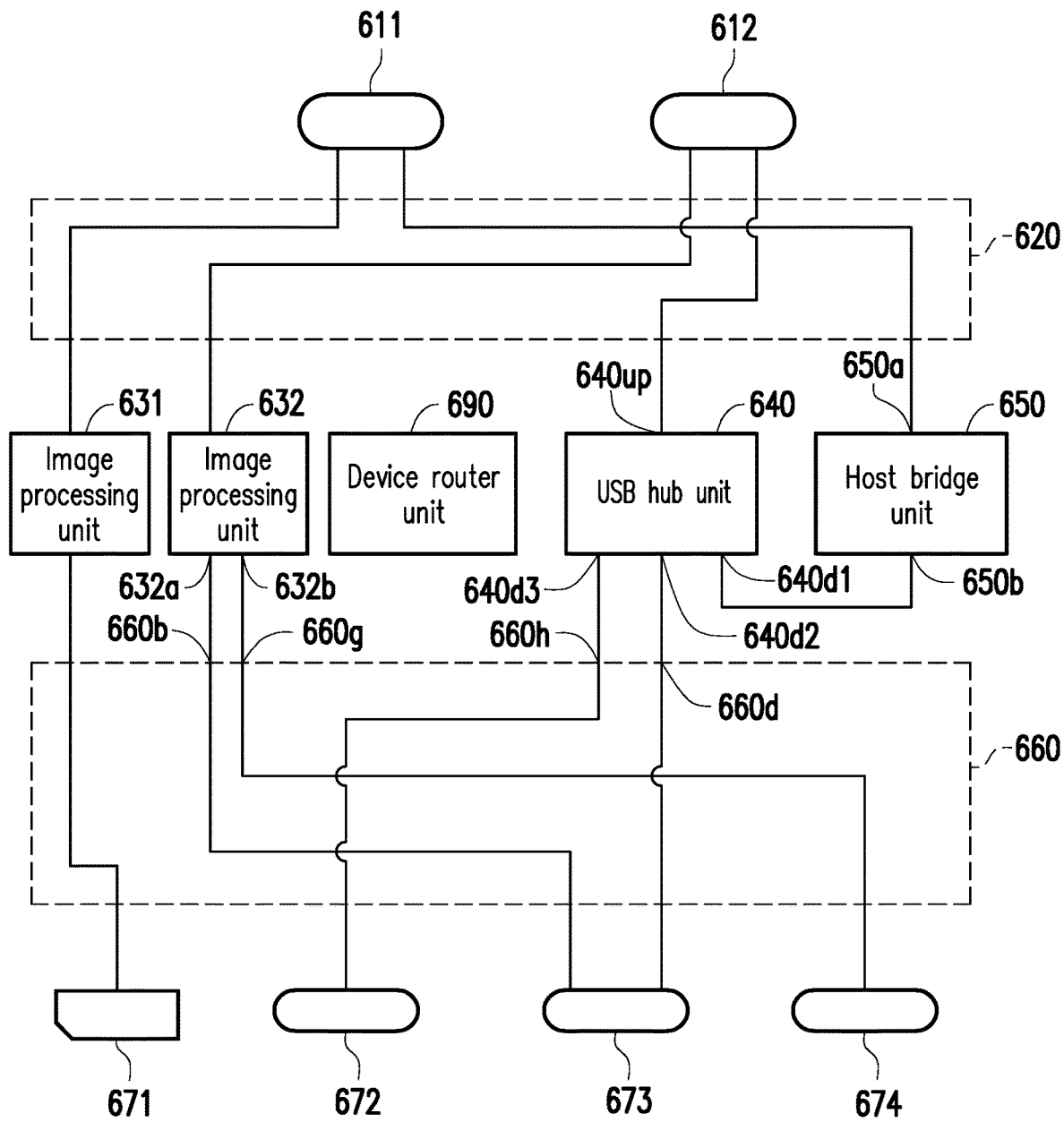

An operation scenario of the multiplexer 620 shown in FIG. 14 is the same as the operation scenario of the multiplexer 620 shown in FIG. 13, therefore the description of the multiplexer 620 is omitted. An operation scenario of the multiplexer 660 shown in FIG. 14 is the same as the operation scenario of the multiplexer 660 shown in FIG. 12, therefore the description of the multiplexer 660 is omitted.

The controller 180, the USB hub unit 140, the host bridge unit 150, the image processing unit 131, the image processing unit 132, the controller 680, the USB hub unit 640, the host bridge unit 650, the image processing unit 631, the image processing unit 632, and/or the device router unit 690 may be implemented as hardware, firmware, software (or a program), or a combination of at least two of the foregoing three, according to different design requirements.

In terms of hardware, the controller 180, the USB hub unit 140, the host bridge unit 150, the image processing unit 131, the image processing unit 132, the controller 680, the USB hub unit 640, the host bridge unit 650, the image processing unit 631, the image processing unit 632, and/or the device router unit 690 may be implemented as a logical circuit on an integrated circuit. Related functions of the controller 180, the USB hub unit 140, the host bridge unit 150, the image processing unit 131, the image processing unit 132, the controller 680, the USB hub unit 640, the host bridge unit 650, the image processing unit 631, the image processing unit 632, and/or the device router unit 690 may be implemented as hardware by using hardware description languages (such as Verilog HDL or VHDL) or other suitable programming languages. For example, the related functions of the controller 180, the USB hub unit 140, the host bridge unit 150, the image processing unit 131, the image processing unit 132, the controller 680, the USB hub unit 640, the host bridge unit 650, the image processing unit 631, the image processing unit 632, and/or the device router unit 690 may be implemented in one or more controllers, microcontrollers, microprocessors, application-specific integrated circuits (ASICs), digital signal processors (DSPs), field programmable gate arrays (FPGAs), and/or various logic blocks, modules, and circuits in other processing units.

In terms of software and/or firmware, the related functions of the controller 180, the USB hub unit 140, the host bridge unit 150, the image processing unit 131, the image processing unit 132, the controller 680, the USB hub unit 640, the host bridge unit 650, the image processing unit 631, the image processing unit 632, and/or the device router unit 690 may be implemented as programming codes. For example, general programming languages (such as C, C++, or other assembly languages) or other suitable programming languages are used to implement the controller 180, the USB hub unit 140, the host bridge unit 150, the image processing unit 131, the image processing unit 132, the controller 680, the USB hub unit 640, the host bridge unit 650, the image processing unit 631, the image processing unit 632, and/or the device router unit 690. The programming codes may be recorded/stored in a "non-transitory computer readable medium", such as a read-only memory (ROM), and/or a storage device. The storage device includes a hard disk drive (HDD), a solid-state drive (SSD), or other storage devices.

The recording medium may include a tape, a disk, a card, a semiconductor memory, a programmable logic circuit, etc. A central processing unit (CPU), a controller, a microcontroller, or a microprocessor may read and execute the programming code in the non-transitory computer readable medium, thereby implementing the related functions of the controller 180, the USB hub unit 140, the host bridge unit 150, the image processing unit 131, the image processing unit 132, the controller 680, the USB hub unit 640, the host bridge unit 650, the image processing unit 631, the image processing unit 632, and/or the device router unit 690.

In summary, the USB hub according to the foregoing embodiments provides the multiple USB upstream ports (such as 111 and 112 as shown in FIG. 1, or 611 and 612 as shown in FIG. 6) to facilitate coupling to the multiple USB hosts. The USB hub also provides the multiple image processing units (such as 131 and 132 as shown in FIG. 1, or 631 and 632 as shown in FIG. 6), to enable transmission of the image data of the USB upstream ports to be independent of each other.

Although the disclosure has been described with reference to the above-mentioned embodiments, it is not intended to be exhaustive or to limit the disclosure to the precise form or to exemplary embodiments disclosed. It is apparent to one of ordinary skill in the art that modifications to the described embodiments may be made without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A Universal Serial Bus (USB) hub, comprising:
a plurality of USB upstream ports, comprising a first USB upstream port and a second USB upstream port;
a plurality of downstream ports, comprising a first downstream port and a second downstream port;
a plurality of image processing units, comprising a first image processing unit and a second image processing unit;
a USB hub unit;
a first multiplexer, coupled to the first USB upstream port, the second USB upstream port, the first image processing unit, the second image processing unit, and the USB hub unit, wherein the first multiplexer is coupled between each of the plurality of USB upstream ports and each of the plurality of image processing units;
a second multiplexer, coupled to the first image processing unit, the second image processing unit, the USB hub unit, the first downstream port, and the second downstream port, wherein each of the plurality of image processing units is coupled between the first multiplexer and the second multiplexer to provide multiple parallel graphics processing paths from the first multiplexer to the second multiplexer, and the second multiplexer is coupled between each of the plurality of image processing units and each of the plurality of downstream ports; and
a host bridge unit, coupled to the first multiplexer and the USB hub unit.

2. The USB hub according to claim 1, further comprising:
a controller, coupled to and controlling the first multiplexer and the second multiplexer, wherein the controller negotiates a communication protocol with at least one first electronic device via a configuration channel pin of at least one of the first USB upstream port and the second USB upstream port, and the controller controls a connection route of the first multiplexer according to the communication protocol transmitted on the at least one of the first USB upstream port and the second USB upstream port.

3. The USB hub according to claim 2, wherein the controller negotiates a communication protocol with at least one second electronic device via a configuration channel pin of at least one of the first downstream port and the second downstream port, and the controller controls a connection route of the second multiplexer according to the communication protocol transmitted on the at least one of the first downstream port and the second downstream port.

4. The USB hub according to claim 1, wherein the first image processing unit is a DisplayPort Multi-Stream Transport image processing unit that conforms to a DisplayPort specification, and the second image processing unit is a DisplayPort repeater unit that conforms to the DisplayPort specification.

5. The USB hub according to claim 1, wherein the first multiplexer couples the first USB upstream port to one of the first image processing unit and the second image processing unit, and couples the second USB upstream port to the other of the first image processing unit and the second image processing unit when a communication protocol transmitted on the first USB upstream port and a communication protocol transmitted on the second USB upstream port are both in a DisplayPort alternate mode.

6. The USB hub according to claim 1, wherein the first multiplexer couples the first USB upstream port or the second USB upstream port in a DisplayPort alternate mode to the first image processing unit or the second image processing unit when one of a communication protocol transmitted on the first USB upstream port and a communication protocol transmitted on the second USB upstream port is in the DisplayPort alternate mode.

7. The USB hub according to claim 1, further comprising:
a device router unit, coupled to the first image processing unit, the second image processing unit, and the USB hub unit,
wherein, the first multiplexer is coupled to the device router unit and the second multiplexer is coupled to the device router unit.

8. A multi-image output system, comprising:
a first USB host;
a second USB host;
a USB hub, comprising a first USB upstream port, a second USB upstream port and a plurality of downstream ports;
a first image display device; and
a second image display device,
wherein the first image display device and the second image display device are coupled to two of the downstream ports, and the USB hub comprises:
a plurality of image processing units, comprising a first image processing unit and a second image processing unit;
a USB hub unit;
a first multiplexer, coupled to the first USB upstream port, the second USB upstream port, the first image processing unit, the second image processing unit, and the USB hub unit, wherein the first multiplexer is coupled between the first USB upstream port and each of the plurality of image processing units, and the first multiplexer is coupled between the second USB upstream port and each of the plurality of image processing units;
a second multiplexer, coupled to the first image processing unit, the second image processing unit, the USB hub unit, and the downstream ports, wherein each of the plurality of image processing units is coupled between the first multiplexer and the second multiplexer to provide multiple parallel graphics processing paths from the first multiplexer to the second multiplexer, and the second multiplexer is coupled between each of the plurality of image processing units and each of the plurality of downstream ports; and a host bridge unit, coupled to the first multiplexer and the USB hub unit.

9. The multi-image output system according to claim 8, wherein the USB hub comprises:

a device router unit, coupled to the first multiplexer, the second multiplexer, the first image processing unit, the second image processing unit, and the USB hub unit.

10. The multi-image output system according to claim 9, wherein the USB hub further comprises:

a controller, coupled to and controls the first multiplexer and the second multiplexer, wherein the controller negotiate a communication protocol with at least one of the first USB host and the second USB host via a configuration channel pin of at least one of the first USB upstream port and the second USB upstream port, and the controller controls a connection route of the first multiplexer according to the communication protocol transmitted on the at least one of the first USB upstream port and the second USB upstream port.

11. The multi-image output system according to claim 10, wherein the controller negotiates a communication protocol with at least one of the first image display device and the second image display device via a configuration channel pin of at least one of the downstream ports, and the controller controls a connection route of the second multiplexer according to the communication protocol transmitted on the at least one of the downstream ports.

12. The multi-image output system according to claim 9, wherein the first image processing unit is a DisplayPort Multi-Stream Transport image processing unit that conforms to a DisplayPort specification, and the second image processing unit is a DisplayPort repeater unit that conforms to the DisplayPort specification.

13. The multi-image output system according to claim 9, wherein the first multiplexer couples the first USB upstream port to one of the first image processing unit and the second image processing unit, and couples the second USB upstream port to the other of the first image processing unit and the second image processing unit when a communication protocol transmitted on the first USB upstream port and a communication protocol transmitted on the second USB upstream port are both in a DisplayPort alternate mode.

14. The multi-image output system according to claim 9, wherein the first multiplexer couples the first USB upstream port or the second USB upstream port in a DisplayPort alternate mode to the first image processing unit or the second image processing unit when one of a communication protocol transmitted on the first USB upstream port and a communication protocol transmitted on the second USB upstream port is in the DisplayPort alternate mode.

15. The multi-image output system according to claim 8, wherein the downstream ports comprise an image output port and a USB downstream port.

* * * * *